(12) United States Patent
Levine

(10) Patent No.: US 11,573,596 B2
(45) Date of Patent: Feb. 7, 2023

(54) ACCESSORY DISPLAY DEVICE

(71) Applicant: Alex Cole Levine, Austin, TX (US)

(72) Inventor: Alex Cole Levine, Austin, TX (US)

( * ) Notice: Subject to any disclaimer, the term of this patent is extended or adjusted under 35 U.S.C. 154(b) by 0 days.

(21) Appl. No.: 17/074,632

(22) Filed: Oct. 20, 2020

(65) Prior Publication Data

US 2022/0390982 A1 Dec. 8, 2022

Related U.S. Application Data

(63) Continuation of application No. 16/673,920, filed on Nov. 4, 2019, now Pat. No. 10,809,762.

(51) Int. Cl.
*G06F 1/16* (2006.01)

(52) U.S. Cl.
CPC .......... *G06F 1/1607* (2013.01); *G06F 1/1616* (2013.01); *G06F 1/1632* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,768,096 A * | 6/1998 | Williams | ............ | G06F 1/1616 361/679.04 |
| 6,532,146 B1 * | 3/2003 | Duquette | ............ | G06F 1/1607 361/679.04 |
| 6,667,877 B2 * | 12/2003 | Duquette | ............ | G06F 1/1677 361/679.04 |
| 7,936,558 B2 * | 5/2011 | Chang | ............ | G06F 1/1616 361/679.04 |
| 8,018,715 B2 * | 9/2011 | Chang | ............ | G06F 1/1647 361/679.04 |
| 8,243,471 B2 * | 8/2012 | Liang | ............ | G06F 1/1603 361/810 |
| 8,842,425 B2 * | 9/2014 | Ryu | ............ | G06F 1/1652 361/679.21 |
| 9,523,461 B2 * | 12/2016 | Kuan | ............ | F16M 11/10 |
| 11,209,869 B2 * | 12/2021 | Hudgins | ............ | G06F 1/1654 |
| 11,416,024 B2 * | 8/2022 | Bryant | ............ | G06F 1/1632 |
| 2010/0124006 A1 * | 5/2010 | Chang | ............ | G06F 1/1624 361/679.04 |
| 2016/0154434 A1 * | 6/2016 | Lakhani | ............ | G06F 1/1632 29/592.1 |
| 2020/0278722 A1 * | 9/2020 | Hudgins | ............ | H05K 5/0247 |
| 2021/0080999 A1 * | 3/2021 | Bryant | ............ | G06F 1/1641 |
| 2021/0405702 A1 * | 12/2021 | Hudgins | ............ | G06F 1/166 |
| 2022/0075421 A1 * | 3/2022 | Hudgins | ............ | G06F 1/1616 |

* cited by examiner

*Primary Examiner* — Lisa Lea-Edmonds

(57) ABSTRACT

An accessory display device includes a back support having at least one female support rail, a first hinge coupled to the back support, and a first display coupled to the first hinge. The accessory also includes at least one male support rail configured to slide in an out of the at least one female support rail, a second hinge coupled to the at least one male support rail, and a second display coupled to the second hinge. Further, the accessory includes a tensioning member coupled to the back support on a first end and coupled to the male support rail, the tensioning member configured to cause elastic tension between the back support and the male support rail. Further still, the accessory includes a top lip coupled to the back support.

20 Claims, 9 Drawing Sheets

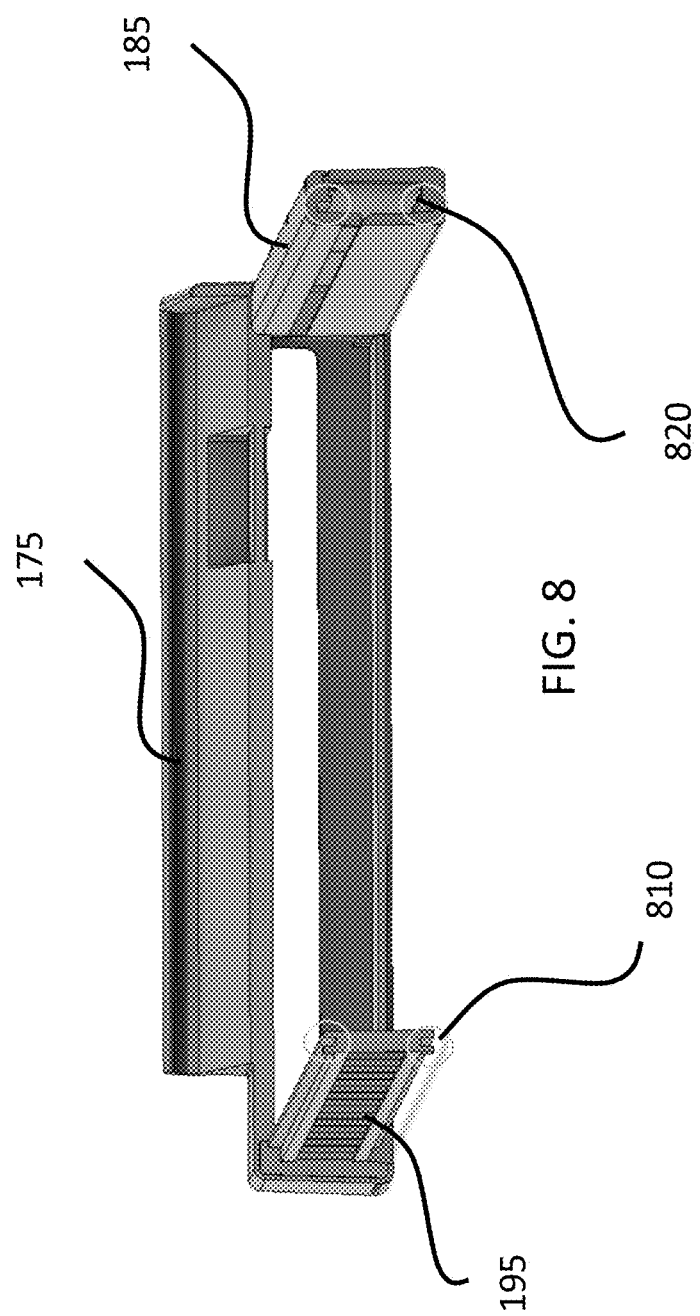

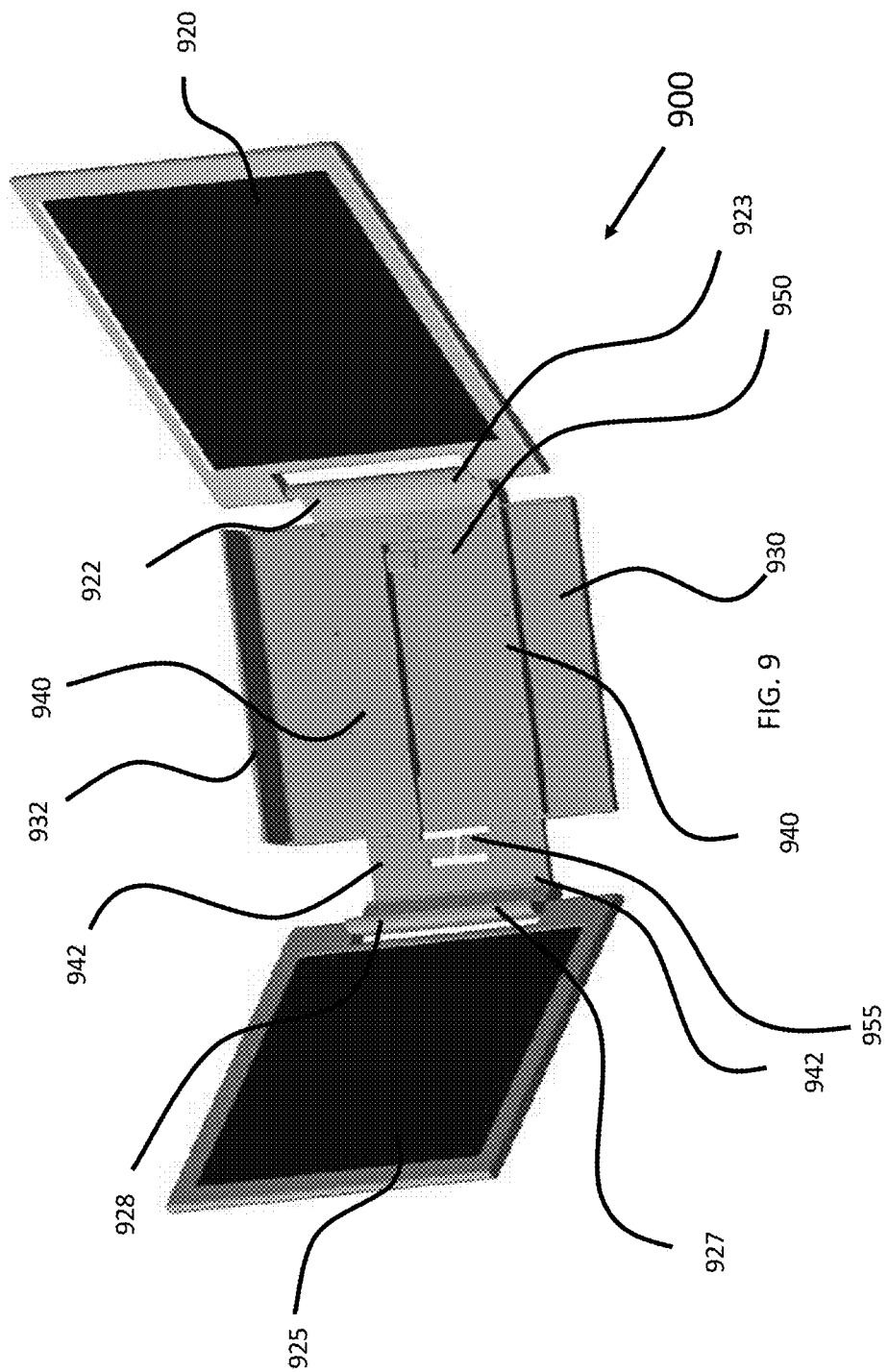

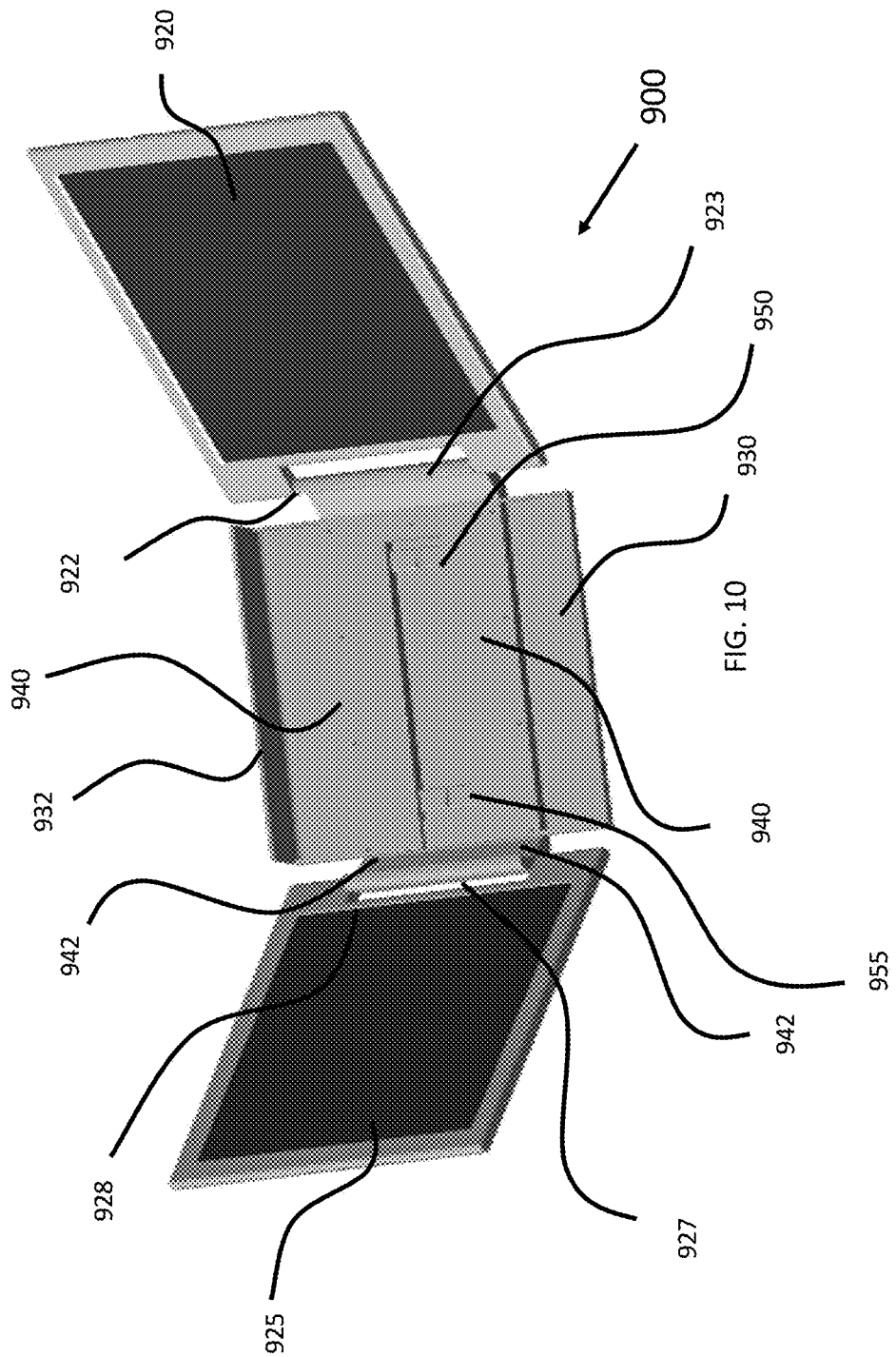

ably vertical edge of the computer display, and a second side lip adjacent the second hinge and configured to engage with another substantially vertical edge of the computer display.

ACCESSORY DISPLAY DEVICE

CROSS-REFERENCE TO RELATED APPLICATIONS

This application is a Continuation-In-Part of U.S. application Ser. No. 16/673,920 filed on Nov. 4, 2019, entitled ACCESSORY DISPLAY DEVICE to Inventor Alex Cole Levine, the entirety of which is herein incorporated by reference.

BACKGROUND

Laptop computers have been a huge benefit for people who like to have the ability of a personal computer wherever they are. Whether it be for work, study, or entertainment, the portability of laptop computers has been very advantageous. However, the tradeoff for laptop computers portability has always been the size of the display screen. The bigger the display, the bigger the laptop computer and the less portable it becomes. Therefore, there is a need for a device which allows for the laptop computer display to be expanded. There is also a need for a device that allows for the laptop computer display to be expanded and may be added onto the laptop computer easily and is also compact and portable.

SUMMARY

One illustrative embodiment relates to an accessory display device for a display device. The accessory includes a back support having at least one female support rail, a first hinge coupled to the back support, and a first display coupled to the first hinge. The accessory also includes at least one male support rail configured to slide in an out of the at least one female support rail, a second hinge coupled to the at least one male support rail, and a second display coupled to the second hinge. Further, the accessory includes a tensioning member coupled to the back support on a first end and coupled to the male support rail, the tensioning member configured to cause elastic tension between the back support and the male support rail. Further still, the accessory includes a top lip coupled to the back support, the top lift configured to engage with a substantially horizontal edge of an object, a first side lip adjacent the first hinge and configured to engage with a substantially vertical edge of the object, and a second side lip adjacent the second hinge and configured to engage with another substantially vertical edge of the object.

Another illustrative embodiment relates to an accessory display device for a computer the computer having a computer display. The accessory includes a back support having at least one female support rail, a first hinge coupled to the back support, and a first display coupled to the first hinge. The accessory also includes at least one male support rail configured to slide in an out of the at least one female support rail, a second hinge coupled to the at least one male support rail, and a second display coupled to the second hinge. Further, the accessory includes a tensioning member coupled to the back support on a first end and coupled to the male support rail, the tensioning member configured to cause elastic tension between the back support and the male support rail. Further still, the accessory includes a top lip coupled to the back support, the top lift configured to engage with a substantially horizontal edge of the computer display, a first side lip adjacent the first hinge and configured to engage with a substantially vertical edge of the computer display, and a second side lip adjacent the second hinge and configured to engage with another substantially vertical edge of the computer display.

Yet another illustrative embodiment relates to an accessory display device for a computer. The accessory relates to a back support having at least one female support rail, a first hinge coupled to the back support, a first display coupled to the first hinge. The accessory also includes at least one male support rail configured to slide in an out of the at least one female support rail, a second hinge coupled to the at least one male support rail, and a second display coupled to the second hinge. Still yet another illustrative embodiment relates to a tensioning member coupled to the back support on a first end and coupled to the male support rail, the tensioning member configured to cause elastic tension between the back support and the male support rail and a top lip coupled to the back support, the top lift configured to engage with a substantially horizontal edge of the computer display.

In addition to the foregoing, other aspects are described in the claims, drawings, and text forming a part of the disclosure set forth herein. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF THE DRAWINGS

FIG. 8 is an example embodiment of a perspective end view of the left side housing portion.

FIG. 9 is a depiction of an accessory display device for a laptop computer in accordance with another example embodiment depicted in a partially expanded position.

FIG. 10 is a depiction of the accessory display device of FIG. 9 in a for a laptop computer in accordance with another example embodiment depicted in a contracted position.

The use of the same symbols in different drawings typically indicates similar or identical items unless context dictates otherwise.

DETAILED DESCRIPTION

Figure 1:
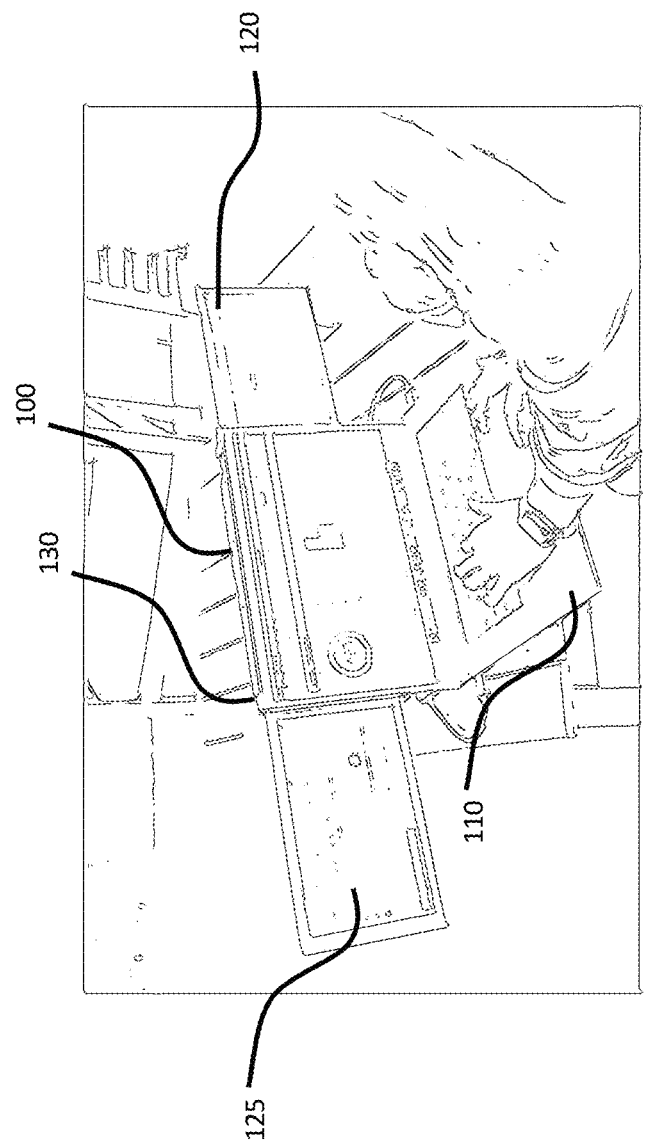
FIG. 1 is a depiction of an accessory display device for a laptop computer in accordance with an example embodiment.

Referring to FIG. 1, a computer display accessory 100 is depicted coupled to a laptop computer 110. Computer display accessory 100 is not limited to laptop computers but may be used on any type of display device including but not limited to tablets, e-readers, gaming devices, desktop displays, television displays, etc. Therefore, computer display accessory 100 is not limited to computers and in fact may be utilized on any type of display. Display accessory 100 adds two additional screens 120 and 125 to any existing display. Display accessory 100 expands the screen display real estate with two slidable screens that pull out from the back edges of a housing 130. Housing 130 itself is universal, fitting laptops of all sizes and uses tension from elastic to tighten around the edges of the laptop screen.

Figure 2:
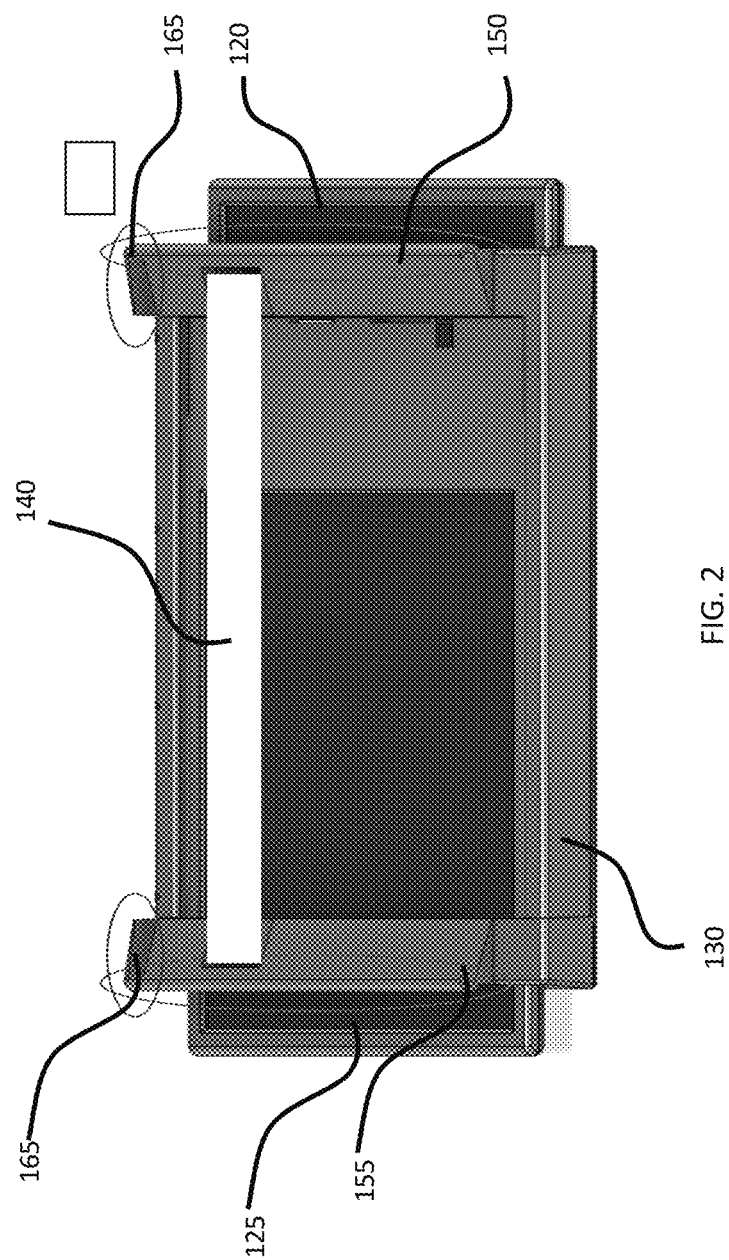
FIG. 2 is an example embodiment of the accessory display device of FIG. 1 removed from the laptop computer.

Referring to FIG. 2, housing 130 includes a mechanism that allows the screens to engage with the lid of the computer display accessory 110 and to pull out from either side. Housing 130 uses an elastic band 140 or other tensioning member to create tension between a right frame clip 150 and a left frame clip 155 which creates force when pulled apart to put on the computer lid, effectively clamping either side to the computer lid. There is also a lip 160 on the top of right frame clip 155 and a lip 165 on the top of left frame clip 155. The lip helps to further secure display accessory 100 on the top of computer 110 display and helps further secure computer display accessory 100 to computer 110. When a user pulls apart the left and right sides of housing 130, an increasing tension is created in the elastic band forcing either side back towards each other. This is what creates the "clamping" effect of the right frame clip 150 and the left frame clip 155.

In accordance with an example embodiment, elastic band 140 may be replaced with any type of suitable tensioning member, including but not limited to a spring, a rubber band, resilient plastic portions, etc. These tensioning members may be coupled to housing portions 170 and 175 in any of a variety of ways including but not limited to with glue, by melting, by tying or sewing, by clipping, etc. In one example, the band 140 may be threaded through a cutout on each portion of housing 130. Once threaded through the cutout, a blocking piece which does not fit through the cutout is affixed to the band so the band does not slip back through the cutout and maintains tension on the band. Any of a variety of ways may be used to attach the tensioning member to the two housing portions without departing from the scope of the invention.

Figure 3:
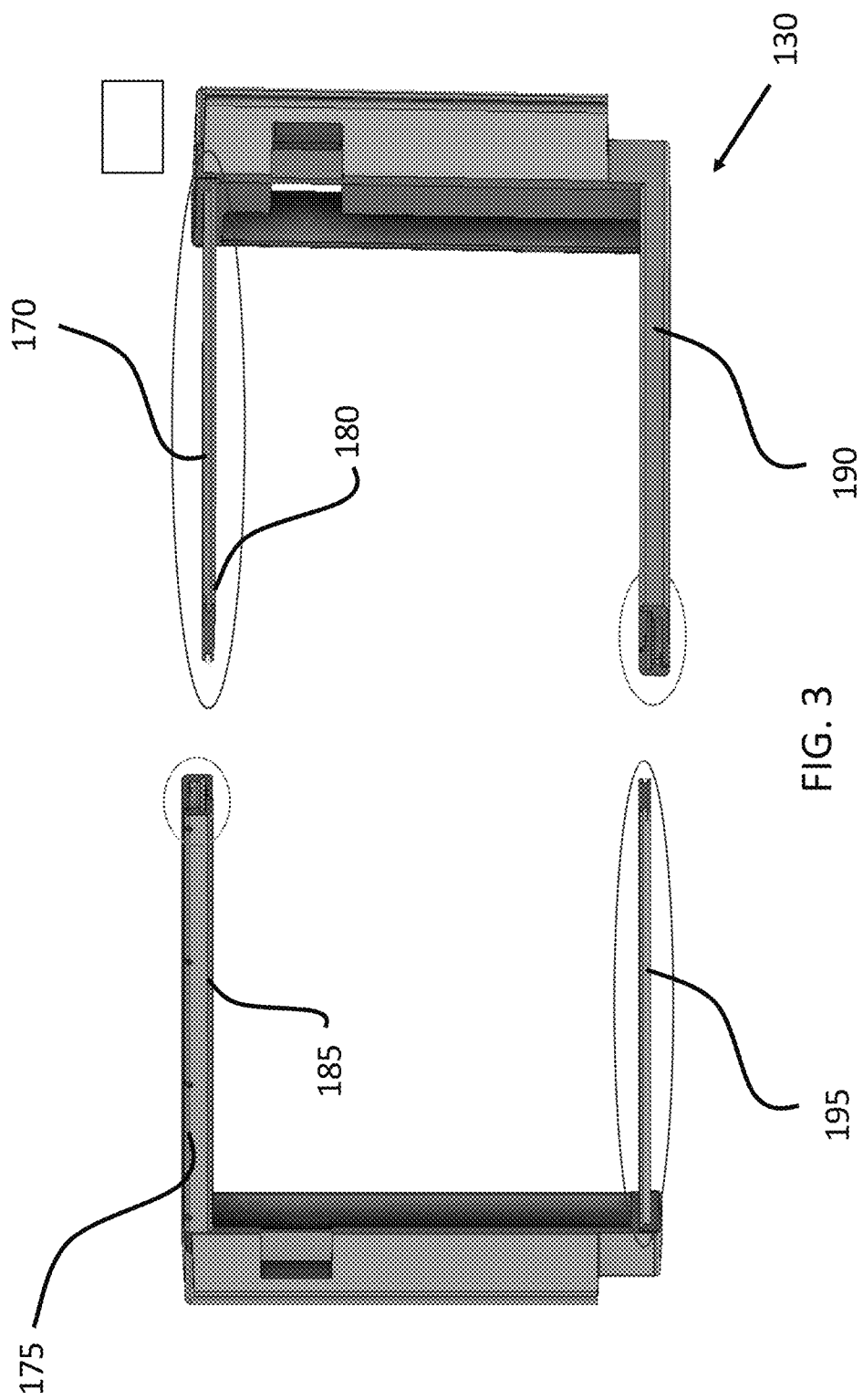
FIG. 3 is an example embodiment of the housing accessory display device of FIG. 1 in an exploded view.
Figure 5:
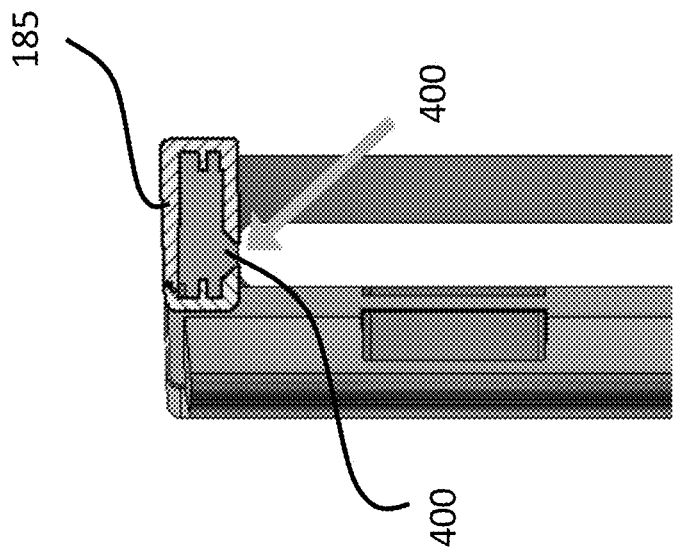
FIG. 5 is an example cross-sectional view of the female rail of FIG. 4.

Referring now to FIG. 3, the main part of housing 130 is shown as an exploded view of the two primary portions, right portion 170 and left portion 175. Right portion 170 includes an upper rail 180 and a lower rail 190. Likewise, left portion 175 includes an upper rail 185 and a lower rail 195. Upper rail 185 comprises a hollow female rail while upper rail 180 acts as a male rail complementary to rail 185 and slidable within rail 185. Lower rail 190 comprises a hollow female rail while lower rail 195 acts as a male rail complimentary to rail 190 and slidable within rail 190. This design allows for housing 130 to be expandable to clamp onto virtually any size and type of display housing.

Once housing 130 is affixed to a computer or other display, a user may pull either or both of two display screens 120 and 125 from a stowed position to a use position as depicted in FIG. 1.

Figure 4:
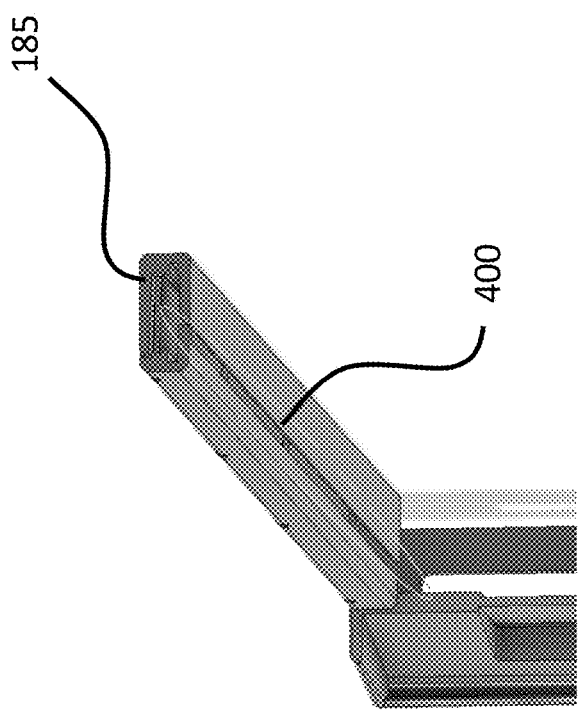
FIG. 4 is an example embodiment of a female rail of the housing.
Figures 6, 7:
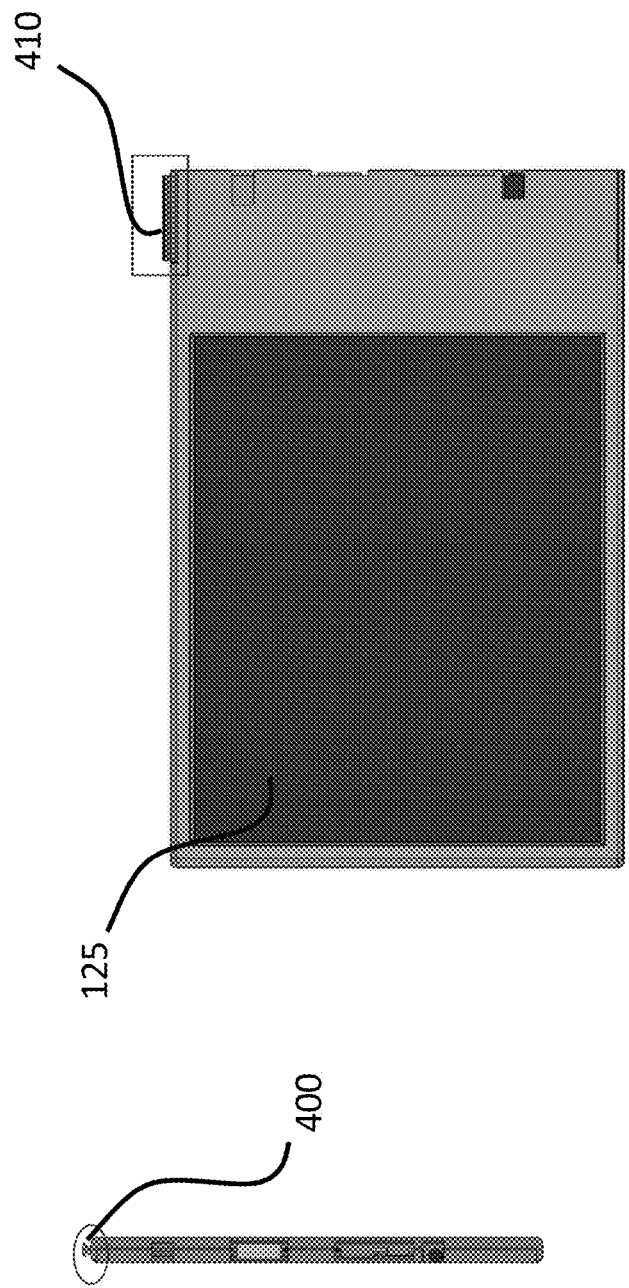
FIG. 6 is an example embodiment of a side view of a display showing a rail guide.
FIG. 7 is an example embodiment of a front view of the display of FIG. 6 showing a rail guide.

Referring now to FIG. 4, a triangular notch on the female sides of upper rail 185 and also lower rail 190 which are both the female rails, act to engage a triangular guiding slide 410 as depicted in FIG. 6 and FIG. 7 for display 125. Likewise, a triangular guiding slide is on the bottom edge of display 120. The cross-sectional view depicted in FIG. 6 shows how the triangular guiding slide 410 interfaces with the triangular notch 400.

Triangular guiding slide 400 also serves as a stopper to prevent the screen from falling out of rail 185 as display 125 is extended. Triangular guiding slide 400 also acts as a stopper on the other end of female rail 185 so that display 125 doesn't fall out the rail internally when display 125 is stowed.

Referring now to FIG. 8, an end view of the rails 185 and 195 of the left portion 175 of the housing 130 is depicted. Male rail 195 includes two guides that run along the length of rail 810. Guides 810 engage with female rail 190 which has a female cross-section similar to the female cross-section of rail 185. Rail 185 is depicted with a pair of opposing notches 820 that run along rail 185 and are configured to engage guides on male rail 180 like guides 810 of rail 195. The use of a combination of guides and complementary notches on rails 185 and 180 and similarly rails 195 and 190 allows for accurate sliding engagement of the two portions 170 and 175 of housing 130. The rail to rail engagement depicted is one example of an arrangement to enable expandability of housing 130 however any of a variety of other ways may be used without departing from the scope of the invention.

Referring now to FIG. 9, a computer display accessory 900 is depicted for coupling to a laptop computer or other computer display or object. Computer display accessory 900 is not limited to laptop computers but may be used on any type of display device including but not limited to tablets, e-readers, gaming devices, desktop displays, television displays, etc. Therefore, computer display accessory 900 is not limited to computers and in fact may be utilized on any type of display. Display accessory 900 adds two additional screens 920 and 925 to any existing display. Display accessory 900 expands the screen display real estate with two slidable screens that pull away from the each other. A back support 930 is configured to fit laptops of a variety of sizes and uses tension from an elastic or other tensioning mechanism to tighten around the edges of the laptop screen. Back support 930 is coupled to and supports display 920. Display 920 is coupled to a hinge 922 which may be part of or coupled to back support 930. Back support 930 also supports a set of female rails 940. In accordance with an illustrative embodiment, a second display 925 is coupled to a pair of male support rails 942 by a hinge 927. Male support rails 942 are configured to slide in and out of female support rails 940. The sliding of male support rails 942 in and out of female support rails 940 allows the expansion of the distance between displays 920 and 925 in order to accommodate a larger primary display of the laptop computer or the like. Back support 930 includes a top lip portion 932. Top lip portion 932 is configured to allow display accessory 900 to hang on the top edge of a display screen of a laptop computer or the like. Hinge 927 also includes a lip portion 928, as well hinge 922 includes a lip portion 923. Lip portions 928 and 923 are configured to grasp onto the side of a display of a laptop computer or the like. A tensioning elastic strap provides tension to pull lips 928 and 923 together to grasp and hold it in place on a display screen of a laptop computer or like in such a configuration as shown in FIG. 1 where display accessory 900 can replace display accessory 100 for a similar configuration.

Referring now to FIG. 10, it may be seen how accessory 900 may be contracted as compared to FIG. 9. Male support rails 942 slide into female support rails 940. In various embodiments a tensioning device such as an elastic band (similar to the band 140 in FIG. 2) would extend from tensioning points 950 and 955, bringing displays 920 and 925 toward each other and allowing lips 923 and 928 to grasp a display screen of a notebook computer or the like. Again, this illustrative configuration allows the use of varied sizes of main display screens that accessory 900 may be attached to for use therewith.

Figure 11:
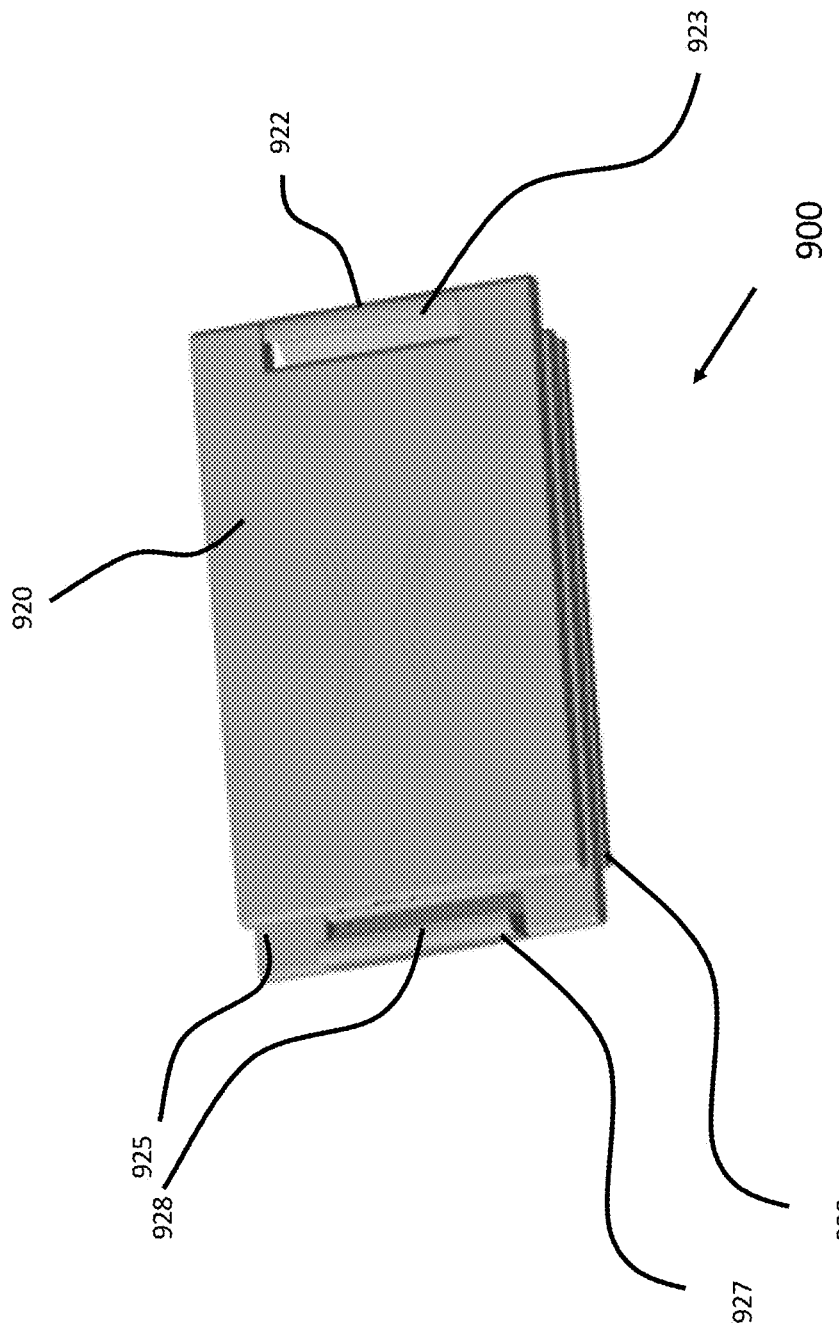
FIG. 11 is a depiction of the accessory display device of FIG. 9 in a for a laptop computer in accordance with another example embodiment depicted in a folded storage position.

Referring now to FIG. 11, accessory 900 is depicted in a folded stowage configuration. Accessory 900 includes the back support 930 overlaid with display 925 which is folded by hinge 927 to be flush with the back support 930. Display 920 is then folded over by hinge 922 to be flush with display 925. This folded configuration provides for more compact configuration of the accessory 900 for stowing. In accordance with various embodiments, display 920 may also be swung about hinge 922 180 degrees from the position depicted in FIG. 11 to be flush with the rear of a display screen of a laptop computer or the like that accessory 900 is mounted to. Alternatively, hinge 927 may be configured to allow display 925 to swing behind a laptop display or the like. If either of displays 920 or 925 are configured to swing around the backside of the laptop display, they may act as rear facing displays for any of a variety of purposes.

It should be noted that the device described may be formed of a number of different materials and formed in a variety of shapes without departing from the scope of the invention. Also, it should be noted that embodiments of the accessory device are designed to couple to the display device, such as but not limited to a laptop computer display, in a manner that is secure enough to carry the laptop computer with the accessory device attached thereto. In this way the portability of a device, such as a laptop computer is not compromised.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An accessory display device, comprising:
   a back support having at least one female support rail;
   a first hinge coupled to the back support;
   a first display coupled to the first hinge;
   at least one male support rail configured to slide in and out of the at least one female support rail;
   a second hinge coupled to the at least one male support rail;
   a second display coupled to the second hinge;
   a tensioning member coupled to the back support on a first end and coupled to the male support rail, the tensioning member configured to create elastic tension between the back support and the male support rail;
   a top lip coupled to the back support, the top lip configured to engage with a substantially horizontal edge of an object;
   a first side lip adjacent the first hinge and configured to engage with a substantially vertical edge of the object; and
   a second side lip adjacent the second hinge and configured to engage with another substantially vertical edge of the object.

2. The accessory display device of claim 1, wherein the at least one female rail is integrated with the back support.

3. The accessory display device of claim 1, wherein the at least one male support rail has a substantially flat rectangular cross-section.

4. The accessory display device of claim 1, wherein the first hinge allows rotation of the first display 270 degrees.

5. The accessory display device of claim 1, wherein the second hinge allows rotation of the second display 270 degrees.

6. The accessory display device of claim 1, wherein the second display screen is configured to be folded over the back support and the first display screen is configured to be folded over the second display screen.

7. The accessory display device of claim 1, wherein the first display screen is configured to be folded over the back support and the second display screen is configured to fold over the first display screen.

8. The accessory display device of claim 1, wherein the tensioning member comprises an elastic band.

9. The accessory display device of claim 1, wherein the tensioning member comprises a spring.

10. An accessory display device for a computer, the computer having a computer display, comprising:
   a back support having at least one female support rail;
   a first hinge coupled to the back support;
   a first display coupled to the first hinge;
   at least one male support rail configured to slide in an out of the at least one female support rail;
   a second hinge coupled to the at least one male support rail;
   a second display coupled to the second hinge;
   a tensioning member coupled to the back support on a first end and coupled to the male support rail, the tensioning member configured to cause elastic tension between the back support and the male support rail;
   a top lip coupled to the back support, the top lift configured to engage with a substantially horizontal edge of the computer display;
   a first side lip adjacent the first hinge and configured to engage with a substantially vertical edge of the computer display; and
   a second side lip adjacent the second hinge and configured to engage with another substantially vertical edge of the computer display.

11. The accessory display device of claim 10, wherein the at least one female rail is integrated with the back support.

12. The accessory display device of claim 10, wherein at least one male support rail has a substantially flat rectangular cross-section.

13. The accessory display device of claim 10, wherein the first hinge allows rotation of the first display 270 degrees.

14. The accessory display device of claim 10, wherein the second hinge allows rotation of the second display 270 degrees.

15. The accessory display device of claim 10, wherein the second display screen is configured to be folded over the back support and the first display screen is configured to be folded over the second display.

16. The accessory display device of claim 10, wherein the first display screen is configured to be folded over the back support and the second display screen is configured to fold over the first display screen.

17. The accessory display device of claim 10, wherein the tensioning member comprises an elastic band.

18. The accessory display device of claim 10, wherein the tensioning member comprises a spring.

19. The accessory display device of claim 10, wherein at least one of the first display screen and the second display screen is configured to be rotated to a position to serve as a rear display for the computer.

20. An accessory display device for a computer, comprising:
   a back support having at least one female support rail;
   a first hinge coupled to the back support;
   a first display coupled to the first hinge;
   at least one male support rail configured to slide in an out of the at least one female support rail;
   a second hinge coupled to the at least one male support rail;
   a second display coupled to the second hinge;
   a tensioning member coupled to the back support on a first end and coupled to the male support rail, the tensioning member configured to cause elastic tension between the back support and the male support rail;
   a top lip coupled to the back support, the top lift configured to engage with a substantially horizontal edge of the computer display.

* * * * *